March 29, 1932.  I. J. D. FAIRHURST  1,851,821
CHAIN HOOK
Filed Sept. 4, 1929
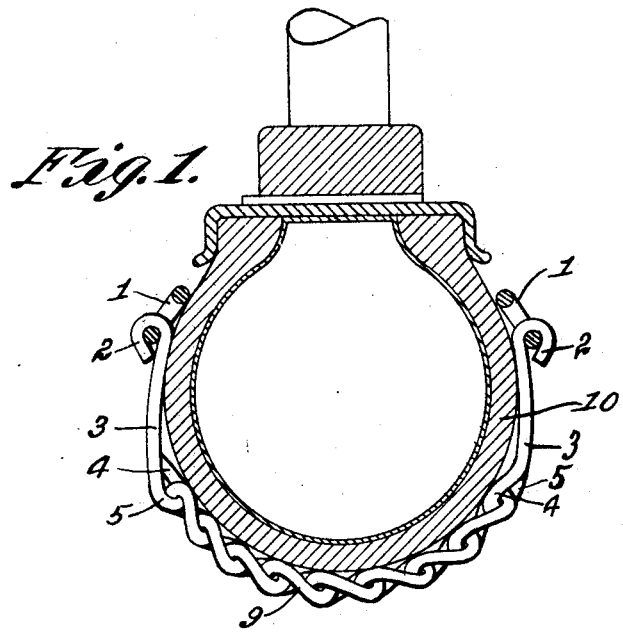
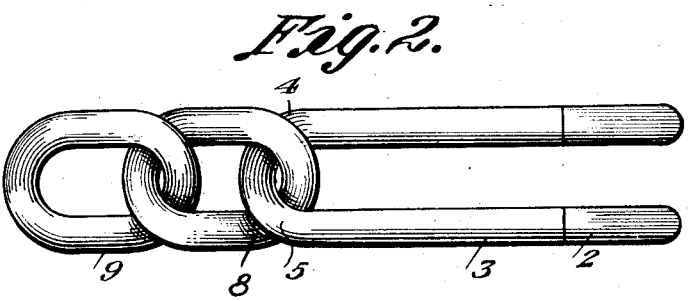
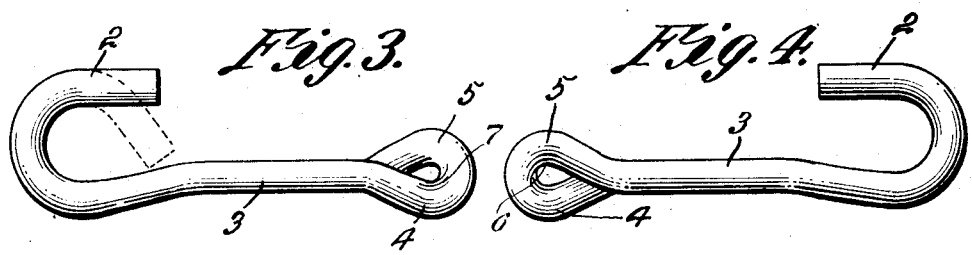
Isaac J. D. Fairhurst,
INVENTOR
WITNESS: William Thompson
BY Victor J. Evans
ATTORNEY Patented Mar. 29, 1932

1,851,821

UNITED STATES PATENT OFFICE

ISAAC J. D. FAIRHURST, OF MANCHESTER, IOWA

CHAIN HOOK

Application filed September 4, 1929. Serial No. 390,339.

My present invention has reference to a hook for connecting the cross chains to the side chains of an anti-skid chain.

With the ordinary construction of hooks for this purpose the rounded connecting portion for the parallel arms thereof is arranged in the same plane as the arms, with the result that the end links of the cross chains engaged by the hooks bite into and consequently injure the tire. It is, therefore, an object of this invention to provide a hook for this purpose in which the rounded connecting portion for the parallel arms of the substantially U-shaped hook is twisted or crooked at opposite outward curvatures from the center thereof so that the end links of the cross chains may be received in the opposite depressions thus provided in the said portions of the hook and be arranged in substantial parallelism with the said arms of the hook and consequently will be prevented from biting into and injuring the tire when the antiskid chain is in applied position.

A further and very important object of this invention is the provision of a chain hook that comprises a substantially U-shaped member having rounded ends that provide the hooks, and in which the connecting portion for the arms of the hook is crooked or twisted in a manner to conform to the twist in the chain link engaged thereby and wherein the link of the cross chain will be provided with a less twist than that afforded in the same size links of cross chains of the ordinary construction and will have a greater bearing upon the said twisted or crooked end of the hook so that the life thereof is greatly extended, and likewise wherein the cross chain will be arranged approximately in the same plane as that of the plate and will inflict less injury to the tire than will those of ordinary cross chain constructions.

The accompanying drawings illustrate the improvement.

In the drawings:

Figure 1 is a transverse sectional view through a pneumatic tire provided with an anti-skid chain having hooks in accordance with this invention.

Figure 2 is a plan view of one of the hooks showing the manner in which the end links of the side chains engage therewith.

Figure 3 is a side elevation of the hook.

Figure 4 is a similar view but looking toward the reverse side thereof.

Figure 5 is an end view looking toward the connecting element for the parallel arms of the hook.

It will be noted as the description progresses that a chain hook constructed in accordance with my invention may have arranged thereon the end link of a cross chain with a less determined twist than those of the ordinary type of such links. This will materially add to the life of the cross chain as the links thereof will not be provided with sharpened curves which, incident to the frictional contact thereof with the ground surface quickly wear and render deficient such ordinary type of cross chains. It will be further understood that cross chains having their links formed with less determined and, therefore, less sharpened curves than those of the ordinary links will afford more bearing or traction engaging surfaces, and further that the links engaged by the improved hook construction will have their several curved or twisted surfaces resting upon the several curved or twisted portions of the chain hook so that more effective bearing surfaces are provided between the hooks and the links of the cross chains.

In Figure 1 of the drawings the links of the side chains of an anti-skid chain construction are indicated by the numeral 1. The side chains have their links of the ordinary formation and their end links are, of course, suitably connected. Certain of the links 1 are engaged by the rounded ends 2 on the parallel arms 3 of the substantially U-shaped chain hooks which are constructed in accordance with the present invention. The rounded connecting portions for the parallel arms of the chain hooks are of a particular and peculiar shape. The end of each arm 3, at its said connecting portion is curved or rounded at opposite outward angles, as indicated by the numerals 4 and 5, this construction being best disclosed by Figure 4 of the drawings. The portions 4 and 5 are, of course, connected by an outwardly rounded portion 6. Between the arms and the opposite rounded portions 4 and 5 the arms of the hook are formed with oppositely disposed inwardly directed curved portions 7 and 8, respectively.

The links that comprise cross chains 9 are formed with longer or less determined curves than those of the links of ordinary cross chains, and the end links of the cross chains are designed to be received between the arms 3 of the chain hooks, prior to the said hooks engaging with the links of the side chains 1 and, as disclosed by the dotted lines in Figure 5 of the drawings the end or connecting links of the cross chains will find three separate and distinct bearing surfaces, those afforded by the rounded portions 7 and 8 of the arms 3 of the chain hook and the inner face of the curved or rounded portion 6 of the said chain hooks. By this arrangement it will be apparent that the cross chains will be supported in a plane substantially parallel to that of the chain hooks, and further by this construction it will be seen that a greater bearing surface is provided between the chain hooks and the end cross links which materially add to the life of the links and because of the position of the links with respect to the chain hooks as previously mentioned prevent the said cross chains from inflicting injury to the tire upon which the anti-skid chain is arranged. Furthermore, it will be noted that by constructing the cross chains with a less twist or less determined curvatures than those of the ordinary cross chain links more bearing surface is afforded and also that cross chains constructed with this particular type of links will be afforded a far greater life than those of the ordinary cross chain construction.

The advantages of the construction will, it is thought, be understood and appreciated and that further detailed description will not be required.

Having described the invention, I claim:

A hook adapted to be used at the side of a resilient tire casing for connecting cross chain sections with the longitudinal chains of an anti-skid chain, consisting of a rod section arcuately bent at a point midway between its ends, said arcuate bend being twisted in ogee shape transversely, the said arcuate and twisted bend merging at its ends into straight side lengths, spaced from each other in parallel relation and merging at their ends in hook extremities, the bill ends of which are disposed toward the arcuate twisted bend, the backs of said hooks being pitched at angles with relation to the axes of the straight side lengths, the median plane of each hook lying coplanar with the axes of the side length from which it springs and the axes of the parallel straight side lengths lying coplanar with the center of the arc of said bend.

In testimony whereof I affix my signature.

ISAAC J. D. FAIRHURST.